No. 732,994. PATENTED JULY 7, 1903.
J. F. APPLEBY.
REEL SUPPORT FOR HARVESTERS.
APPLICATION FILED OCT. 10, 1902.
NO MODEL.
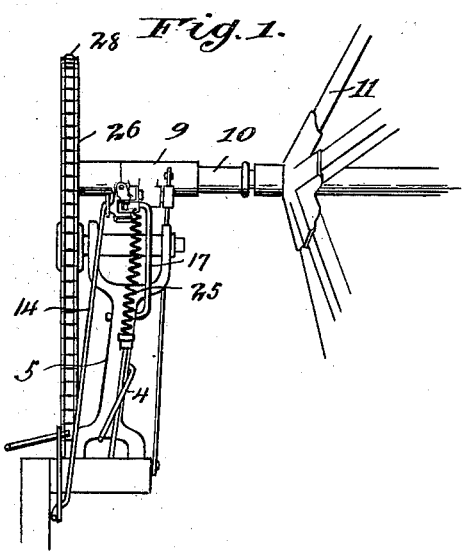
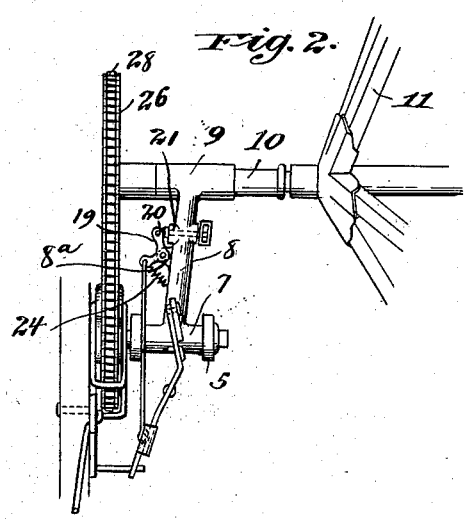
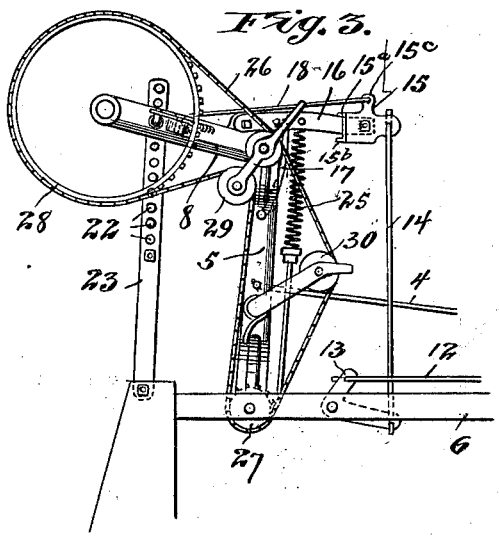
Witnesses,
Inventor,
John F. Appleby,
By Offield, Towle & Linthicum
Attys.

No. 732,994. Patented July 7, 1903.

UNITED STATES PATENT OFFICE.

JOHN F. APPLEBY, OF CHICAGO, ILLINOIS, ASSIGNOR TO ACME HARVESTER COMPANY, OF PEORIA, ILLINOIS, A CORPORATION OF ILLINOIS.

REEL-SUPPORT FOR HARVESTERS.

SPECIFICATION forming part of Letters Patent No. 732,994, dated July 7, 1903.

Original application filed May 15, 1899, Serial No. 716,911. Divided and this application filed October 10, 1902. Serial No. 126,743. (No model.)

*To all whom it may concern:*

Be it known that I, JOHN F. APPLEBY, a citizen of the United States, residing at Chicago, in the county of Cook and State of Illinois, have invented certain new and useful Improvements in Reel-Supports for Harvesters, of which the following is a specification.

My invention relates to reel-supports for harvesting-machines, and has for its object to provide an improved mechanism for raising and lowering the reel to suit varying heights of grain and also to move the reel forward and back to vary its position relatively to the sickle.

By my invention I effect the raising, lowering, and locking of the reel in adjusted position by the movement of a single actuating-lever or other operating means at the driver's platform, while the means I employ to shift the reel back and forward relatively to the sickle do not interfere with the mechanism for adjusting the vertical height of the reel.

My invention consists in a mechanism adapted to perform the functions stated, substantially as hereinafter described, and pointed out in the claims.

In the accompanying drawings, Figure 1 is a front elevation, Fig. 2 a top plan view, and Fig. 3 a side elevation, of a new and improved mechanism embodying my invention in its preferred form.

My invention has been more particularly designed for use in connection with self-binding harvesters of the type wherein the binding mechanism is mounted upon an A-frame balanced over the main ground or driving wheel, said frame supporting the usual accessory devices—such as the grain-platform, the binder, the butter, the grain-board, the sickle, and the reel—and being operated by a push-pole and driver's platform in the rear. Such a machine is illustrated in my pending application for Letters Patent on a harvester, Serial No. 716,911, filed May 15, 1899, allowed July 23, 1902, of which application the present application constitutes a division.

Referring to the drawings for a more particular description of my invention, 4 designates a rod or link which at its rear end is directly or indirectly connected to an actuating-lever (not shown) or other operating means adapted to effect a positive longitudinal movement of said link in either direction. At its forward end said link is pivoted to a yoke-standard 5, which latter is pivoted at its lower end on the usual reel-support bar 6 and at its upper end embraces the tubular head 7 of a tubular reel-carrying arm 8, having a tubular head 9 for the reel-shaft 10, carrying the usual reel 11.

From the foregoing it will be evident that the longitudinal reciprocation of the connecting-rod 4 by the actuating-lever or other operating means at the driver's platform will swing the reel forward and back to bring it closer to or farther from the sickle.

In order to adapt the machine to cut short or lodged grain, the reel is provided with a vertical adjustment, so that it may be raised and lowered, and this movement is secured by means of a mechanism which effects the raising, lowering, and locking and unlocking of the reel through the manipulation of a single actuating connection extending to the driver's platform. Referring to this mechanism in detail, 12 designates a connecting-rod, which is itself connected either directly or indirectly to a lever or other actuating means (not shown) at the driver's platform and at its forward end is pivoted to one arm of a bell-crank 13, mounted at its angle on the support-bar 6, slightly in rear of the pivotal support of the yoke-standard 5 thereon. From the other arm of the bell-crank a link 14 extends upwardly and is connected to a block 15, pivoted upon the rear end of a lever 16, the latter being pivoted at its forward end to the reel-carrying bar 8, forwardly of the pivot of the latter. A strut 17 connects the lever 16 with the yoke-standard 5 and constitutes the fulcrum-support of the lever 16. The block 15 has upper and lower flanges $15^a$ and $15^b$, embracing the rear arm of lever 16, and has a certain amount of play thereon.

From an upstanding lug $15^c$ on the block 15 a rod 18 extends forward to the nearer arm of a bell-crank 19, that is pivoted at its bend upon a lateral lug $8^a$ of the pivoted reel-carrying arm 8 and having its farther arm connected to a locking-bolt 20, which slides through an aperture in a keeper 21, formed in or on the arm 8, and is adapted to enter one of a series of holes 22 in a standard 23, pivoted at its lower end upon the framework of the machine. The locking-bolt 20 is normally held in engagement with one of the apertures of the standard by means of a spring 24, which backs up the bell-crank.

25 is a counterbalance-spring connected at its upper end to the lever 16 rearward of its fulcrum and at its lower end suitably anchored to the support-bar 6.

26 indicates the usual reel-driving sprocket-chain, which, actuated from a driving-sprocket 27, pivoted on the support-bar 6, engages and rotates the large reel-driving sprocket 28 on the reel-shaft, the driving-chain being suitably guided and tensioned by idler-pulleys 29 and 30.

The operation of the mechanism is as follows: Assuming that it is desired to raise the reel above the position shown in the drawings and that it is locked, the lever or other actuating means at the driver's platform will be operated through such a movement as to draw the rod 12 backward, rocking the bell-crank 13 and pulling down on the link 14 and rocking the pivoted block 15. The initial rocking movement of the pivoted block will operate through the rod 18 and bell-crank 19 to withdraw the locking-bolt 20, and thus release the reel-supporting arm from the supporting-standard 23, and the continued movement of the pivoted block will cause its flanges to engage and clamp the lever 16, whereupon the continued downward pull of the link 14 rocks the lever 16 on its fulcrum-support on the stud 17, and thus raises the reel-supporting arm and the reel. The locking of the reel at the end of this upward movement is effected by a quick reverse movement imparted to the connecting-rod 12 through the actuating means at the driver's platform, this movement serving to impart a quick reverse rocking movement of the block 15, and thereby permit the spring 24 to force the locking-bolt into operative engagement with the standard 23 before the momentum of the upward movement of the reel has ceased. When it is desired to lower the reel, the rod 12 is again drawn backward by the actuating-lever or other means at the driver's platform to release the locking mechanism, and thereupon the weight of the reel will cause it to descend, the actuating-rod 12 moving forward in a yielding movement at a rate corresponding to the rate of descent of the reel, and when the latter has reached the desired position the operator imparts to the rod 12 a quick accelerated movement in the same direction, which permits the locking-bolt under the impulse of its actuating-spring 24 to engage the next aperture reached in its travel. The forward and backward adjustment of the reel is effected in an obvious manner through a corresponding forward and backward thrust or pull on the connecting-rod 4 through the operating-lever or other actuating device at the driver's platform, this adjustment being readily permitted by reason of the fact that both the yoke-standard 5 and the supporting-standard 23, carrying the reel and its actuating and adjusting devices, are pivotally mounted at their lower ends, while the reel-supporting arm 8, pivotally connecting said uprights at their upper end is capable of angular variation relatively to both uprights to accommodate the forward and backward oscillations of the latter. It is also to be noted that such forward and backward adjustments of the reel are capable of being made without interfering with the operativeness and effectiveness of the mechanism for vertically adjusting and locking the reel.

I do not limit my invention to the precise details of construction or relative arrangement of the several parts hereinabove described, since it is obvious that the structural details might be variously modified without departing from the gist of the invention and its fundamental principal of operation.

I claim—

1. A reel supporting and adjusting mechanism for harvesting-machines, comprising in combination a reel-shaft, a support therefor, said support being pivotally mounted, whereby, when rocked on its pivot, the reel is raised and lowered, and means for raising, lowering, locking and unlocking the reel in its adjusted position, comprising a lever connected to the reel-support, a locking mechanism for holding said support in its adjusted position, and connections extending from said locking mechanism to said lever and thence to a single actuating rod or link connected with the driver's platform, said connections operating first upon the locking mechanism and then upon said lever to shift the reel, substantially as described.

2. A reel supporting and adjusting mechanism for harvesting-machines, comprising in combination a reel-shaft, a support therefor, said support being pivotally mounted, a lever for rocking said support on its pivot, a locking mechanism for locking said support in its adjusted position, said locking mechanism including a locking-bolt and a spring for holding said bolt in the locking position, means for withdrawing the locking-bolt and for rocking the lever whereby to raise and lower the reel, said means comprising lever-and-link connections extending from said locking-bolt to said lever and thence to a single actuating rod or link connected with the driver's platform, said connections operating first to withdraw the locking-bolt and then, by a further movement, to rock said lever and thereby raise or lower the reel-support, substantially as described.

3. A reel supporting and adjusting mechanism for harvesting-machines, comprising in combination a pivotally-mounted reel-support, a pivoted locking-standard adjacent to said reel-support, a locking-bolt having an operating-spring normally tending to lock said reel-support to said standard, a lever connected by one arm to the reel-support for rocking it on its pivot, a flanged block pivotally and loosely mounted on the opposite arm of said lever, connections intermediate said block and said locking-bolt for withdrawing the latter, and other connections extending from said block to a single actuating rod or link operated from the driver's platform, said actuating rod or link serving, through the described connections, to first withdraw the locking-bolt and subsequently raise or lower the reel, substantially as described.

4. A reel supporting and adjusting mechanism for harvesting-machines, comprising in combination a reel-shaft, a supporting-arm therefor, a standard pivoted at its lower end on the framework of the machine and having said shaft-supporting arm pivoted in its upper end, a locking-standard also pivoted at its lower end in the frame of the machine in advance of said reel-supporting standard, a locking mechanism through which said reel-supporting arm may be engaged with said locking-standard at varying heights thereon, a lever one arm of which is connected to the reel-supporting arm for rocking it on its pivot, a flanged block pivotally and loosely mounted on the opposite arm of said lever, actuating connections between said block and said locking mechanism, other actuating connections between said block and a single actuating rod or link connected with the driver's platform, through the movements of which latter the locking mechanism is first released by rocking said flanged block upon its lever-support, and subsequently the reel-supporting arm is raised or lowered through the clamping action of said flanged block upon its supporting-lever effecting or controlling the rocking of the latter, and an actuating rod or link connected with said reel-supporting standard for oscillating the latter and thus shifting the reel forward or backward, substantially as described.

JOHN F. APPLEBY.

Witnesses:
  E. H. MAHNQUIST,
  M. S. DAVIDSON.